(12) United States Patent
Zheng et al.

(10) Patent No.: US 10,258,927 B2
(45) Date of Patent: Apr. 16, 2019

(54) CENTRIFUGAL DYNAMIC FILTERING APPARATUS AND CELL SEPARATION SYSTEM USING SAME

(71) Applicants: Chong Zheng, Guangdong (CN); Zhengyu Zhou, Guangdong (CN)

(72) Inventors: Chong Zheng, Guangdong (CN); Zhengyu Zhou, Guangdong (CN)

(*) Notice: Subject to any disclaimer, the term of this patent is extended or adjusted under 35 U.S.C. 154(b) by 273 days.

(21) Appl. No.: 15/230,516

(22) Filed: Aug. 8, 2016

(65) Prior Publication Data

US 2016/0340638 A1 Nov. 24, 2016

Related U.S. Application Data

(63) Continuation-in-part of application No. 14/547,159, filed on Nov. 19, 2014, now abandoned, which is a continuation of application No. PCT/CN2012/086694, filed on Dec. 14, 2012.

(30) Foreign Application Priority Data

Sep. 2, 2015 (CN) .......................... 2015 1 0560187
Sep. 2, 2015 (CN) ..................... 2015 2 0683199 U

(51) Int. Cl.
*B01D 63/16* (2006.01)
*B04B 5/04* (2006.01)
*B01D 61/18* (2006.01)

(52) U.S. Cl.
CPC ............ *B01D 63/16* (2013.01); *B01D 61/18* (2013.01); *B04B 5/0442* (2013.01); *B01D 2315/02* (2013.01); *B04B 2005/0478* (2013.01)

(58) Field of Classification Search
CPC .... B01D 63/16; B01D 61/18; B01D 2315/02; B01D 2311/2676; B04B 5/0442; B04B 2005/0478

See application file for complete search history.

(56) References Cited

U.S. PATENT DOCUMENTS 3,966,507 A * 6/1976 Herbert ..................... B04B 7/08
                                                                148/524
4,098,456 A * 7/1978 Bayham ................ B04B 5/0442
                                                               494/17

(Continued)

FOREIGN PATENT DOCUMENTS

CN           2676200 Y      2/2005

*Primary Examiner* — David C Mellon
*Assistant Examiner* — Liam Royce

(57) ABSTRACT

The present invention directs to a centrifugal filtration device, for separating living cells, including a spindle (28), a rotary arm (211) which is connected vertically to the spindle (28), a microporous membrane filter (31A;31B) which is mounted on the rotary arm (211), and a liquid distributor (4) arranged above the spindle (28). The microporous membrane filter (31A;31B) includes an inlet (311A;311B), an outlet (312A;312B), a front cavity (313A; 313B) having the inlet (311A;311B) formed thereon, a rear cavity having the outlet (312A;312B) formed thereon, and a filter membrane (315A;315B) arranged between the front cavity and the rear cavity; the diameter of each filter pore formed in the filter membrane is smaller than that of the cell which needs to be separated. The present invention also discloses a cell separation system.

8 Claims, 5 Drawing Sheets

(56) References Cited

U.S. PATENT DOCUMENTS

| | | | | |
|---|---|---|---|---|
| 4,296,882 | A | * | 10/1981 | Kobayashi ............ B04B 5/0442 366/219 |
| 4,377,253 | A | * | 3/1983 | Bruneel ................ B04B 5/0442 422/521 |
| 4,939,087 | A | * | 7/1990 | Van Wie ............... B04B 5/0442 210/651 |
| 5,135,716 | A | * | 8/1992 | Thakore ................. B01D 61/18 422/412 |
| 5,431,814 | A | * | 7/1995 | Jorgensen ............ B01D 33/073 210/399 |
| 2001/0027156 | A1 | | 10/2001 | Egozy et al. |
| 2002/0032112 | A1 | * | 3/2002 | Pages .................... B04B 5/0442 494/36 |
| 2011/0136650 | A1 | | 6/2011 | Ellingboe et al. |
| 2012/0156177 | A1 | * | 6/2012 | Scarpone .............. B04B 5/0421 424/93.7 |

* cited by examiner

CENTRIFUGAL DYNAMIC FILTERING APPARATUS AND CELL SEPARATION SYSTEM USING SAME

CROSS-REFERENCE TO RELATED APPLICATIONS

The present application is a Continuation-in-part Application of U.S. application Ser. No. 14/547,159 filed on Nov. 19, 2014, which is a Continuation Application of PCT application No. PCT/CN2012/086694 filed on Dec. 14, 2012. The present application also claims priority of Chinese patent application Nos. 201510560187.5 and 201520683199.2, both filed on Sep. 2, 2015. All the contents of the above applications are hereby incorporated by reference.

FIELD OF THE INVENTION

The present invention relates to biological cell separation field, especially for a centrifugal filtration device and a cell separation system having a microporous membrane filter, and a rapid cell separation method is obtained by using this system.

BACKGROUND OF THE INVENTION

The best treatment of disease is reconstruction of living tissue and growing tissue which is worn out by old age or disease into new tissue, this treatment is called "Cell Treatment". The cell treatment has a century's history, and is widely used in all fields of tumor treatment, liver treatment and dermabrasion, and it has vast development prospects.

The basic question for cell treatment is separating target cell. In prior art, cell separation is carried out by centrifuges; this separating method not only has fussy operation, but also results in mechanical trauma and pollution to cell, owing to the operation which requires drawing out and putting in cell liquid again and again, and this kind of operation requires very strict laboratory environment, which impacts cell quality, and increases cost for cell separation.

Consequently, the improved device, system and method for cell separation are needed.

SUMMARY OF THE INVENTION

One purpose of the present invention is to provide a centrifugal filtration device with simple structure and easy operation, this device is capable of separating cells rapidly in a fully sealed system, which decreases cell damage during the separation process, and avoids cell pollution, and the cell separation process could be automatically controlled by the computer.

In order to achieve the above purpose, the present invention provides the following technical solution:
A centrifugal filtration device, for separating living cells, characterized by comprising a spindle, a rotary arm which is connected perpendicularly to the spindle and rotating as the spindle rotates, a microporous membrane filter which is mounted on the rotary arm, and a liquid distributor which is arranged on the rotary arm in the place which is over the joint of the spindle and the rotary arm;
wherein the liquid distributor comprises a liquid entrance, a liquid entering chamber, a liquid entering pipe which connects the liquid entrance and the liquid entering chamber, a liquid exit, a liquid exiting chamber, and a drain pipe which connects the liquid exit and the liquid exiting chamber, the liquid entering chamber has at least one liquid fill port, the liquid exiting chamber has at least one drain port;
the microporous membrane filter comprises an inlet, an outlet, a front cavity having the inlet formed thereon, a rear cavity having the outlet formed thereon, and a filter membrane arranged between the front cavity and the rear cavity; the inlet is in communication with the liquid fill port, the outlet is in communication with the drain port, each filter pore formed in the filter membrane has a diameter smaller than that of each of the living cells which needs to be separated; the inlet and the front cavity are arranged further away from the spindle than the outlet and the rear cavity are arranged; during centrifugation water in a cell suspension, biological particle and biomolecules pass through the filter membrane owing to a flowing fluid pressure, and the living cells are blocked by the filter membrane and flung from the filter membrane to deposit in the front cavity due to the centrifugal force.

Preferably, the rotary arm has a length of 10-30 cm, the rotary arm has a rotation speed of 500-1500 revolutions per minute, and the centrifugal force produced by the rotary arm is 50-800 g.

Preferably, a cross section of the front cavity is round, the area of the cross section of the front cavity becomes smaller in the direction which is away from the filter membrane.

Preferably, the diameter of the filter pore formed in the filter membrane is 1-30 μm.

Preferably, the filter membrane has a monolayer membrane structure, the filter pore runs through the filter membrane and the filter pore is cylindrical.

Preferably, the liquid entering pipe and the drain pipe are coaxial.

Preferably, the front cavity includes an upper wall which is adjacent to the filter membrane, the inlet is formed on the upper wall.

Preferably, the front cavity includes a side wall which is connected to the upper wall, a passage extending to the bottom of the front cavity is formed inside the side wall, and the passage is in communication with the inlet.

The second purpose of the present invention is to provide a cell separation system having said centrifugal filtration device, especially having a microporous membrane filter, with simple structure and easy operation. This cell separation system provides a fully sealed system for separating cells automatically, which could avoid cell pollution.

In order to achieve the above purpose, the present invention provides the following technical solution:
a disposable fully sealed piping system and an instrument system; wherein the disposable fully sealed piping system comprises a microporous membrane filter, a primary filter, a liquid distributor, a disposable syringe, an equilibrium liquid container, a cell suspension container, an enzyme solution container, and a pipe assembly; the microporous membrane filter comprises an inlet, an outlet, a front cavity having the inlet formed thereon, a rear cavity having the outlet formed thereon, and a filter membrane arranged between the front cavity and the rear cavity, the area of a cross section of the front cavity becomes smaller in the direction which is away from the filter membrane; each filter pore formed in the filter membrane has a diameter smaller than that of each of the living cells which needs to be separated; the inlet and the front cavity are arranged further away from a spindle than the outlet and the rear cavity are arranged, and during centrifugation water in a cell suspension, biological particle and biomolecules pass through the filter membrane owing to a flowing fluid pressure, and the living cells are blocked by the filter membrane and flung from the filter membrane to deposit in the front cavity due to the centrifugal force; the pipe assembly comprises a first pipe, a second pipe, a third pipe, a fourth pipe, a fifth pipe, a sixth pipe, and a seventh pipe; the cell suspension container is inverted, whose opening is communicated to the first pipe; the primary filter is mounted on the first pipe; the equilibrium liquid container is inverted, whose opening is communicated to the second pipe, and the second pipe is connected to the first pipe; one end of the third pipe is communicated to a junction between the first pipe and the second pipe, and an opposite end is communicated to the disposable syringe; one end of the fourth pipe is communicated to the disposable syringe, an opposite end is communicated to a liquid entrance of the liquid distributor; one end of the fifth pipe is communicated to a liquid fill port of the liquid distributor, an opposite end is communicated to the inlet tube of the microporous membrane filter; one end of the sixth pipe is communicated to the outlet of the microporous membrane filter, and an opposite end is communicated to a drain port of the liquid distributor; a liquid exit of the liquid distributor is communicated to a waste collection tank; one end of the seventh pipe is communicated to the junction between the first pipe and the second pipe, and an opposite end is communicated to the enzyme solution container; the instrument system comprises a rotary arm assembly having a rotary arm, an injection pump, a temperature control unit for equilibrium liquid, a temperature control unit for cell suspension, a vibrator for cell suspension, and a plurality of electromagnetic controlling valves; an end of the rotary arm assembly is mounted on the microporous membrane filter, the liquid distributor are arranged above the spindle which drives the rotary arm; the disposable syringe is controlled by the injection pump; the temperature control unit for equilibrium liquid is arranged outside the equilibrium liquid container, to heat the equilibrium liquid and control its temperature; the temperature control unit for cell suspension is arranged outside the cell suspension container, to heat the cell suspension and control its temperature; the cell suspension container and the temperature control unit for cell suspension are arranged on the vibrator for cell suspension, which oscillates the cell suspension container automatically with a frequency predetermined by a computer; the plurality of electromagnetic controlling valves comprise a first controlling valve, a second controlling valve, a third controlling valve, and a fourth controlling valve; the first controlling valve is mounted on the first pipe, and arranged in front of the junction between the first pipe and the second pipe; the second controlling valve is mounted on the second pipe; the third controlling valve is mounted on the fourth pipe, and arranged between the liquid distributor and the disposable syringe; the fourth controlling valve is mounted on the seventh pipe.

Preferably, the diameter of each filter pore formed in the primary filter is larger than that of a target cell, and the diameter of the filter pore of the primary filter is 200-300 mesh.

Preferably, the electromagnetic controlling valve is an electromagnetic pinch valve, to control the opening and closing of the pipe assembly.

Preferably, the diameter of the filter pore formed in the filter membrane is 1-30 um.

Preferably, the filter membrane has a monolayer membrane structure, the filter pore runs through the filter membrane and the filter pore is cylindrical.

Preferably, the front cavity includes an upper wall which is adjacent to the filter membrane, the inlet is formed on the upper wall.

Preferably, the front cavity includes a side wall which is connected to the upper wall, a passage extending to the bottom of the front cavity is formed inside the side wall, and the passage is connected with the inlet.

The advantage of the present invention is that: the centrifugal filtration device and the cell separation system having said centrifugal filtration device with simple structure and easy operation, are capable of separating cells rapidly in a fully sealed system, which decreases cell damage during the separation process, and avoids cell pollution, the cell separation process could be automatically controlled by the computer, and the cell separation system has low demand in laboratory.

DETAILED DESCRIPTION OF ILLUSTRATED EMBODIMENTS

The embodiments of the present invention are disclosed in detail by combining with figures below. All the following are the preferred embodiments of the present invention, which is not the limitation of the protection of the present invention.

Figure 1:
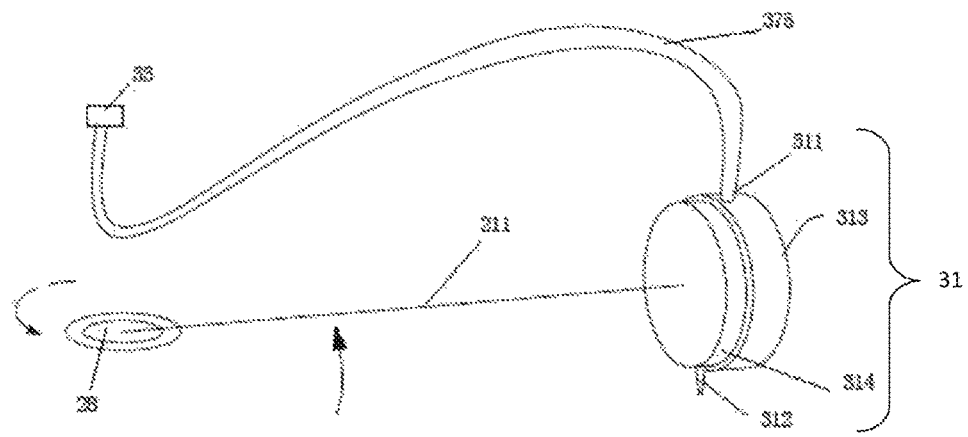
FIG. 1 is a schematic drawing showing a centrifugal filtration device according to an embodiment of the present invention.
Figure 2:
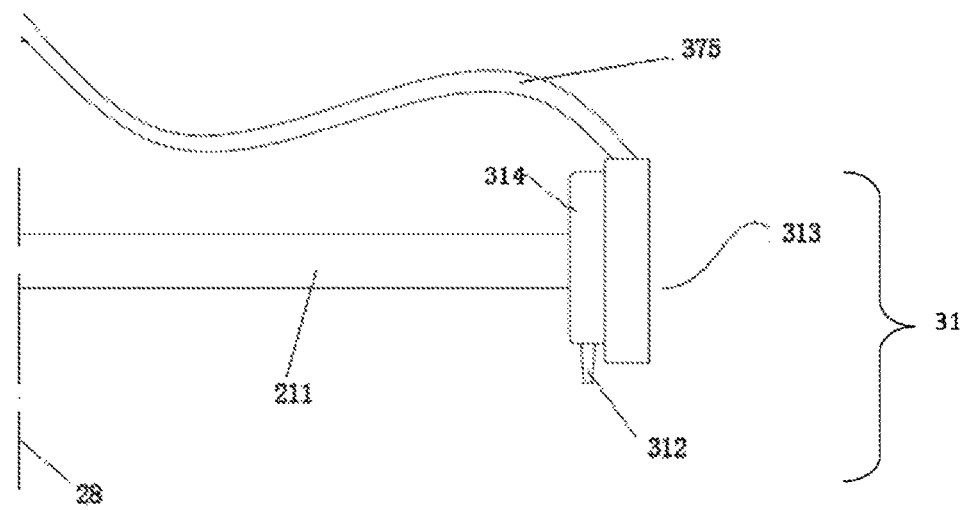
FIG. 2 is a schematic lateral drawing showing the centrifugal filtration device according to an embodiment of the present invention.
Figure 3:
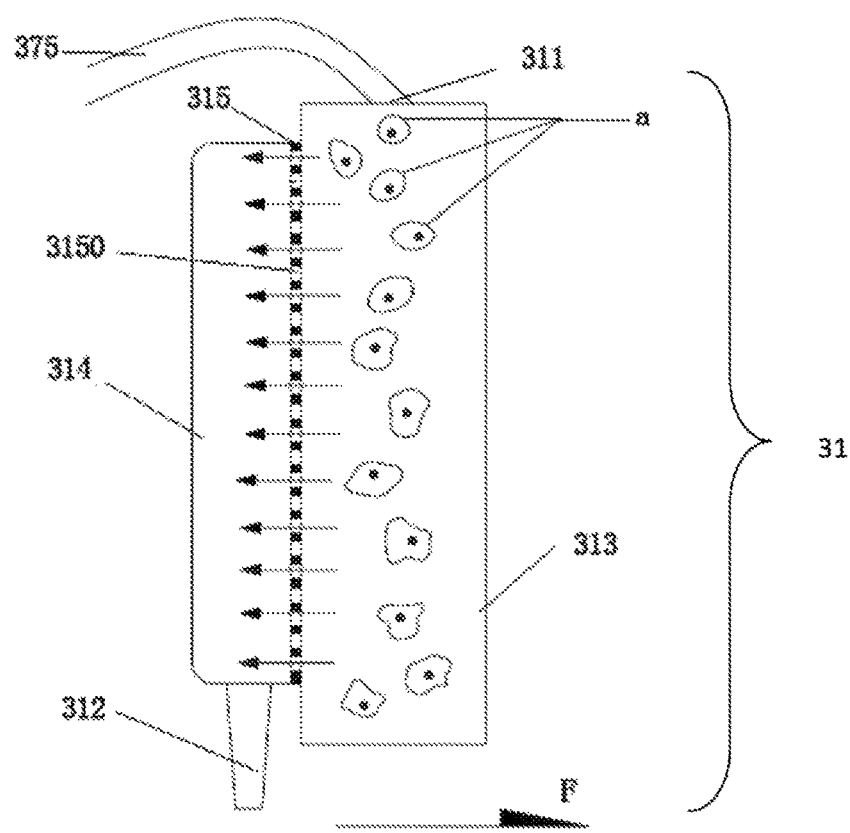
FIG. 3 is a schematic drawing showing the microporous membrane filter of the centrifugal filtration device according to an embodiment of the present invention.

FIGS. 1, 2 and 3 show the centrifugal filtration device according to an embodiment of the present invention, and the centrifugal filtration device for separating cells includes a spindle 28, a rotary arm 211 which is connected perpendicularly to the spindle axis to the spindle and rotating as the spindle rotates, and a microporous membrane filter 31 which is mounted on a far end referring to the rotary arm.

In this embodiment, the microporous membrane filter 31 includes an inlet 311, an outlet 312, a front cavity 313 communicating with the inlet, a rear cavity 314 communicating with the outlet, and a filter membrane 315 arranged between the front cavity 313 and the rear cavity 314.

Preferably, the inlet 311 is formed at the top of the front cavity 313, and the outlet 312 is formed at the bottom of the rear cavity 314, so that the liquid could flow due to the flowing fluid pressure produced by the injection, as shown in FIG. 3.

The filter membrane 315 is hydrophilic membrane, and is made of polyolefins or polyamides material. Preferably, the filter membrane is made of polypropylene, mixed cellulose, PE (polyethylene) material or nylon material. The diameter of the filter pore 3150 formed in the filter membrane 315 is smaller than that of the cell which needs to be separated, so that the cells are blocked by the filter membrane and remain in the front cavity 313, and water and biomolecules pass through the filter membrane and run into the rear cavity 314, and then drain out of the outlet 312. In general, the diameter of the cell is 5-30 µm, therefore the diameter of the filter pore 3150 of the filter membrane 315 is smaller than 5 µm.

Preferably, the diameter of the filter pore of the filter membrane is 1-30 µm; in an optimum embodiment, the diameter of the filter pore is 3 µm-5 µm. Preferably, the filter membrane 315 has a monolayer membrane structure, the filter pore 3150 runs through the filter membrane 315 and the filter pore 3150 is cylindrical, thus the cells which have a diameter larger than the filter pore can be blocked by the surface of the filter membrane, the cells which have a diameter smaller than the filter pore can pass through the filter pore instead of blocking the filter pore.

In this embodiment, the microporous membrane filter 31 has a cavity formed therein whose shape look like a round cake; the surface of the filter membrane which the liquid runs in is arranged on a far end referring to the rotary arm, and the surface of the filter membrane in which the liquid runs out is arranged on a near end referring to the rotary arm. The rotary arm rotates to produce centrifugal force, so that the cells are blocked by the filter membrane and flung from the filter membrane because the cells have bigger size and can withstand more centrifugal force, and the filter pores 3150 are kept open, to make the water and useless or harmful biomolecules run through the filter pores under the flowing fluid pressure.

Preferably, the front cavity 313 is arranged on a far end referring to the rotary arm 211, and the rear cavity 314 is arranged on a near end referring to the rotary arm 211, that is, the location of the front cavity 313 is further away from the rotary arm 211 than that of the rear cavity 314. Therefore, the liquid flows from the inlet 311 to the outlet 312, that is the liquid flows from the end far away the rotary arm 211 towards the near end of the rotary arm 211, and this liquid flowing direction is opposite to that of the centrifugal force on the microporous membrane filter 31 while the rotary arm 211 rotates. The cells are blocked by the filter membrane 315 to remain in the front cavity 313 when the cell suspension are in the front cavity 313, and then the cells are flung from the filter membrane 315 owing to the centrifugal force, and the filter pores 3150 kept open, to keep the filtering process constant.

Figure 4:
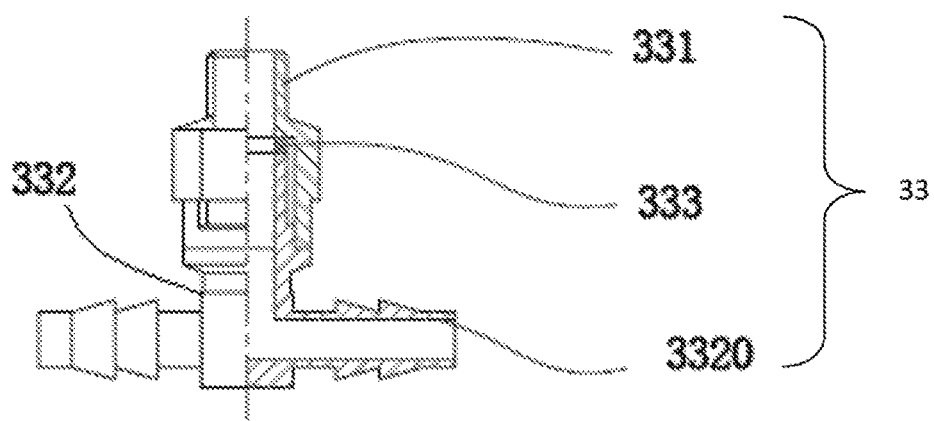
FIG. 4 is a schematic drawing showing the rotary joint according to an embodiment of the present invention.

In one embodiment of the present invention, an inlet tube 375 is connected to a pipe assembly via a rotary joint 33. Specifically, as shown in FIG. 4, the rotary joint 33 includes a fixed component 331 and a rotary component 332, the fixed component 331 has a chamber to receive the rotary component 332 to rotate in the fixed component 331. A seal ring 333 is arranged on the connection between the fixed component 331 and the rotary component 332. The fixed component 331 is fixed and connected to the pipe assembly, and the connecting part 3320 of the rotary component 332 communicates with the inlet tube 375.

Thus, the inlet tube 375 could rotate as the spindle 28 rotates, when the fixed component of the rotary joint is fixed.

Preferably, the rotary joint 33 is arranged on the spindle 28 or its extension cord, so that the inlet tube 375 and the microporous membrane filter 31 rotate synchronously. The rotary joint 33 may be spaced axially apart from the spindle 28 along an axis of rotation thereof, and the rotary component 332 of the rotary joint 33 may be indirectly rotatable by the spindle 28 in synchronization with the rotary arm 211 through the inlet tube 375.

OTHER EMBODIMENTS

Figure 6:
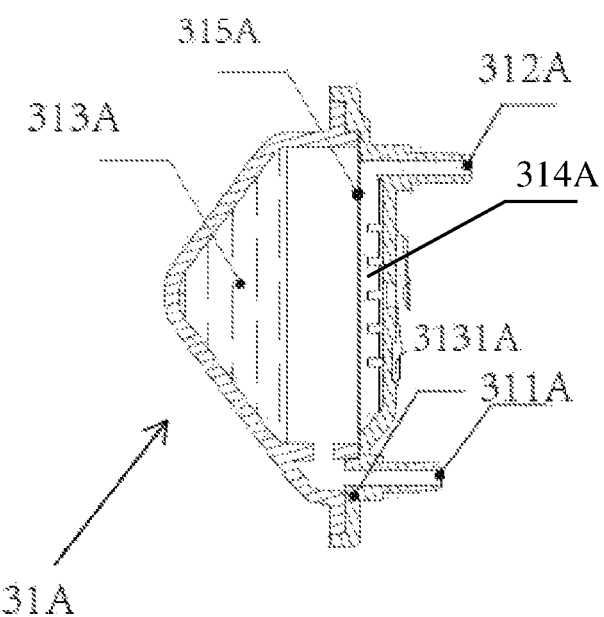
FIG. 6 is a schematic drawing showing the microporous membrane filter of the centrifugal filtration device according to another embodiment of the present invention.
Figure 7:
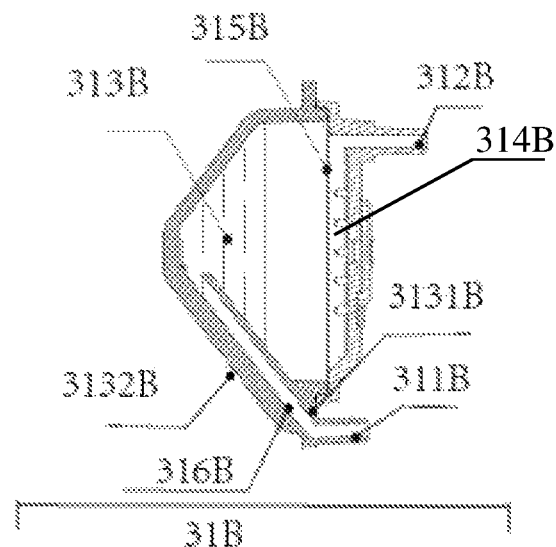
FIG. 7 is a schematic drawing showing the microporous membrane filter of the centrifugal filtration device according to other embodiment of the present invention.

The centrifugal filtration device can have another embodiment, for example, as shown in FIG. 6 and FIG. 7, the microporous membrane filter used in the centrifugal filtration device have other embodiments. Further, in a preferred embodiment, the rotary joint 33 in the centrifugal filtration device can be replaced by a liquid distributor.

As shown in FIG. 6, the microporous membrane filter 31A can have a shape which looks like a cone, it also includes an inlet 311A, an outlet 312A, a front cavity 313A communicating with the inlet 311A, a rear cavity 314A communicating with the outlet 312A, and a filter membrane 315A arranged between the front cavity 313A and the rear cavity 314A. The area of the cross section of the front cavity 313A becomes smaller in the direction which is away from the filter membrane 315A, thus it is easy for cells to remain/deposit in the front cavity 313A owing to the reason that the centrifugal force is bigger in the place which is further away from the spindle. The front cavity 313A includes an upper wall 3131A, which is adjacent to the filter membrane 315A, the inlet 311A is formed on the upper wall 3131A. As shown in FIG. 7, the microporous membrane filter 31B also includes an inlet 311B, an outlet 312B, a front cavity 313B communicating with the inlet 311B, a rear cavity 314B communicating with the outlet 312B, and a filter membrane 315B arranged between the front cavity 313B and the rear cavity 314B. Furthermore, as shown in FIG. 7, the front cavity 313B further includes a side wall 3132B which is connected to the upper wall 3131B, a passage 316B extending to the bottom of the front cavity 313B is formed inside the side wall 3132B, and the passage 316B is in communication with the inlet 311B. By setting the passage 316B, after centrifugation, the cleaning water can be exported into the bottom of the front cavity 313B, at the same time, the cells collected in the front cavity 313B roll up owing to the hydraulic pressure, thus the collected cells can be cleaned up.

Figure 8:
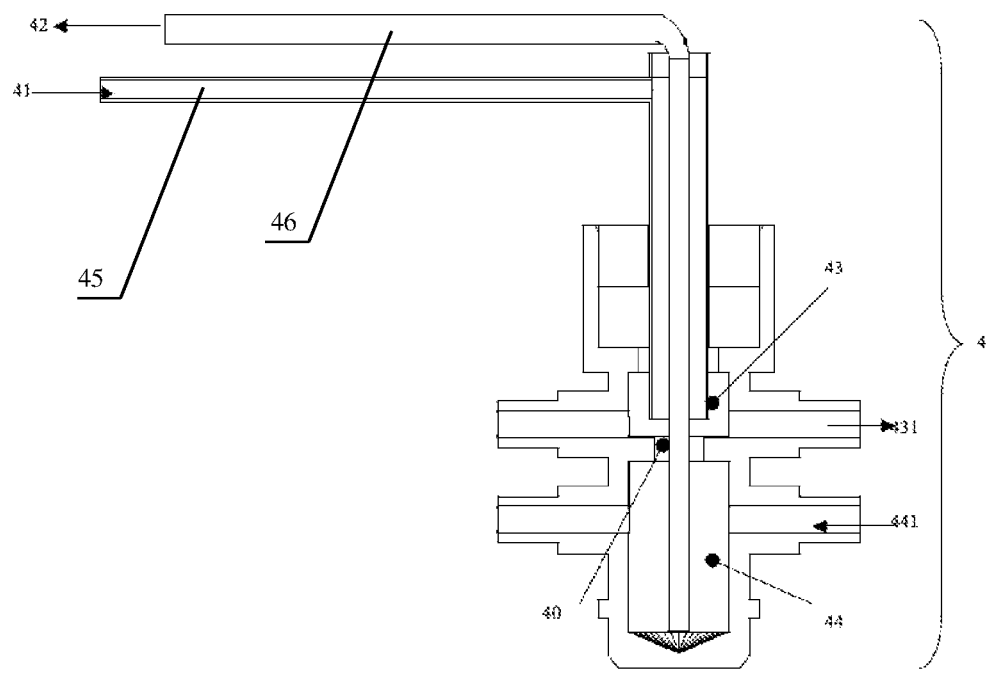
FIG. 8 is a schematic drawing showing the liquid distributor according to another embodiment of the present invention.

Preferably, the rotary joint 33 is replaced by a liquid distributor 4, which can be arranged above the spindle, preferably, the liquid distributor 4 can be mounted on the rotary arm 211 in the place which is over the joint of the rotary arm and the spindle. As shown in FIG. 8, the liquid distributor 4 comprises a liquid entrance 41, a liquid entering chamber 43, a liquid entering pipe 45 between the liquid entrance 41 and the liquid entering chamber 43, a liquid exit 42, a liquid exiting chamber 44, and a drain pipe 46 between the liquid exit 42 and the liquid exiting chamber 44, the liquid entering chamber 43 has at least one liquid fill port 431, the liquid exiting chamber 44 has at least one drain port 441, which means the centrifugal filtration device can have one or more microporous membrane filters set on the rotary arm. The liquid entering chamber 43 and the liquid exiting chamber 44 are separated by a sealer 40, thus the liquid to be filtered will not be polluted by the waste. Moreover, the liquid entering pipe 45 and the drain pipe 46 are coaxial, so that it can reduce the volume of the liquid distributor 4.

In this embodiment, the inlet of the microporous membrane filter is in communication with the liquid fill port 431 by the inlet tube 375, the outlet of the microporous membrane filter is in communication with the drain port 441 by an outlet tube 376. By setting the liquid distributor 4, it is convenient for liquid injection and waste collection, because the operators do not need to bend down to collect the waste.

The cell separation system according to the present invention is described as follow.

Figure 5:
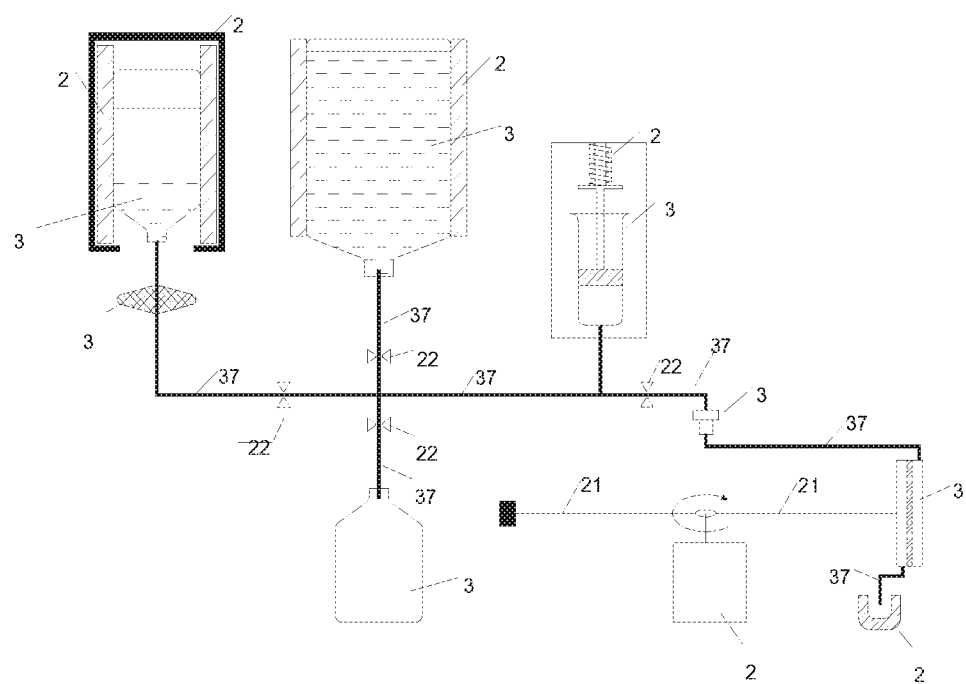
FIG. 5 is a schematic drawing showing a cell separation system having the centrifugal filtration device with the microporous membrane filter shown in FIG. 1.

Referring to FIG. 5, the cell separation system according to one embodiment of the present invention includes two parts, which are a disposable fully sealed piping system and an instrument system.

The disposable fully sealed piping system includes a microporous membrane filter 31, a primary filter 32, a rotary joint 33, a disposable syringe 34, an equilibrium liquid container 35, a cell suspension container 36, an enzyme solution container 38, and a pipe assembly 37. The detailed description is shown as follow.

(1) The structure of the microporous membrane filter 31 of the centrifugal filtration device has been described above.

(2) The primary filter 32 could filter out impurities in the cell suspension. In this embodiment, the primary filter 32 is arranged in the upstream referring to the liquid flowing direction, that is near the cell suspension container 36, so that some larger particles and some impurities (such as some undigested tissues and big molecule) could be filtered out, during the tissue washing and filtering process. Preferably, in this embodiment, based on abundant experiments, the primary filter 32 is a filter with 200 mesh, under such arrangement, the filter effect is the best. The filters with 200-300 mesh are all preferred in the present invention. In other embodiments of the present invention, any filter with suitable structure can be used.

(3) The structure of the rotary joint 33 of the centrifugal filtration device has been described above.

(4) The disposable syringe 34 is driven by the injection pump 23 (it will be described below), for extracting and injecting liquid.

(5) The equilibrium liquid container 35 is used to hold equilibrium liquid (also called buffer or washing liquid), the equilibrium liquid container 35 is kept under 37, controlled by the temperature control unit for equilibrium liquid 24. The temperature of 37 comes closer to human body temperature, which helps to protect the cells. Also, the temperature control unit for equilibrium liquid 24 could be regulated for temperature in accordance with cell protection requirement.

The equilibrium liquid could be Phosphate Buffer Saline (PBS) or Lactated Ringer's solution. In this embodiment, the equilibrium liquid is Lactated Ringer's solution preferably, because the electrolyte concentration, PH value and osmotic pressure are very close to those of the extracellular fluids, so as to helps cell survival, washing away the collagenase from the cell liquid, to eliminate the harmful influence on cells. Preferably, the temperature of the raw materials should be kept close to human body temperature during cells extracting process, therefore the present invention provides the temperature control unit for cell suspension 25, which heats the cell suspension container 36 and control it under certain temperature, which is 37° C. in general.

(6) The cell suspension container 36 is inverted in this embodiment, whose opening is arranged downward. The cell suspension container 36 is used for containing raw materials from the human body for extracting cells, the raw material could be all kinds of tissues, including but not limiting to: adipose tissue, blood, bone marrow, muscle, skin, liver, muscle membrane, placenta, umbilical cord, body fluids, secretions, and cell culture, etc.

In this embodiment, the adipose tissue is separated to harvest adipose stem cells. The adipose tissue could be obtained using any suitable process in prior art, such as liposuction (using a syringe) or lipectomy. The amount of extracting adipose tissue depends on various factors, including: capability of extracting adipose tissue and the necessary amount of adipose stem cells. Preferably, in order to mix the collagenase solution with the adipose tissue quickly, and digesting the adipose tissue quickly using the collagenase, the cell suspension container 36 and the temperature control unit for cell suspension 25 are both arranged on the vibrator for cell suspension 26, to oscillate cell suspension container 36.

(7) The enzyme solution container 38 is used for preparing solution during tissue processing, and the enzyme solution is a collagenase solution in this embodiment.

(8) The pipe assembly 37 comprises a first pipe 371, a second pipe 372, a third pipe 373, a fourth pipe 374, a fifth pipe 375, a sixth pipe 376, and a seventh pipe 377.

The cell suspension container 36 is inverted, whose opening is communicated to the first pipe 371, and the primary filter 32 is mounted on the first pipe 371.

The equilibrium liquid container 35 is inverted, whose opening communicates with the second pipe 372, and the second pipe 372 communicates with the first pipe 371.

One end of the third pipe 373 communicates with the junction between the first pipe 371 and the second pipe 372, and the opposite end communicates with the disposable syringe 34.

One end of the fourth pipe 374 communicates with the disposable syringe 34, and the opposite end communicates with a fixed end of the rotary joint 33.

One end of the fifth pipe 375 communicates with a rotary end of the rotary joint 33, and the opposite end communicates with the inlet of the microporous membrane filter 31.

One end of the sixth pipe 376 communicates with the outlet of the microporous membrane filter 31, and the opposite end communicates with the waste collection tank 27.

One end of the seventh pipe communicates with the junction between the first pipe and the second pipe, and the opposite end communicates with the enzyme solution container.

In this system, when the process of cell separation is finished, the fifth pipe 375 which is connected to the inlet and the sixth pipe 376 which is connected to the outlet are cut by a thermal scissors and sealed, so that the microporous membrane filter 31 are sealed to keep the needed cells stored for use.

All pipes described above could be hard or soft, depending on the actual requirement. In this embodiment, all pipes are made of soft material, such as polyethylene pipe which is usually used, silicon resin pipe, or any other material employed by pipes in prior art. The diameter of the pipe depends on the size or number of the tissue and the flowing speed of the liquid, etc. The pipe is capable of sustaining either positive pressure or negative pressure produced by the syringe.

All parts of the disposable fully sealed piping system are for one time use and fully sealed, which guarantees that the process of separating cells from cell suspension is conducted in a sealed pipe system to avoid pollution.

The instrument system which could be reused for the cell separation system is described below.

Referring to FIG. 5, the instrument system includes a rotary arm, an electromagnetic controlling valve 22, an injection pump 23, a temperature control unit for equilibrium liquid 24, a temperature control unit for cell suspension 25, and a vibrator for cell suspension 26.

An end of a rotary arm 211 of the rotary arm assembly 21 is mounted on the microporous membrane filter 31, a spindle which drives the rotary arm of the rotary arm assembly 21 and a rotation axis of the rotary joint 33 are on a straight line, so that the rotary arm and the rotary joint rotate in synchronism. A balance member 212 with a balance block of the rotary arm assembly 21 is arranged in the opposite end of the rotary arm. The rotary arm assembly 21 is driven by the spindle 28.

The disposable syringe 34 is controlled by the injection pump 23.

The temperature control unit for equilibrium liquid 24 is arranged outside the equilibrium liquid container 35, to heat the equilibrium liquid and control its temperature.

The temperature control unit for cell suspension 25 is arranged outside the cell suspension container 36, to heat the cell suspension and control its temperature. Furthermore, the cell suspension container 36 and the temperature control unit for cell suspension 25 are arranged on the vibrator for cell suspension 26, which oscillates the cell suspension container 36 automatically with the frequency predetermined by the computer.

The electromagnetic controlling valve 22 includes a first controlling valve 221, a second controlling valve 222, a third controlling valve 223, and a fourth controlling valve 224.

The first controlling valve 221 is mounted on the first pipe 371, and arranged in front of the junction between the first pipe 371 and the second pipe 372.

The second controlling valve 222 is mounted on the second pipe 372.

The third controlling valve 223 is mounted on the fourth pipe 374, and arranged between the rotary joint 33 and the disposable syringe 34.

The fourth controlling valve 224 is mounted on the seventh pipe 377.

The first controlling valve 221, the second controlling valve 222, the third controlling valve 223, and the fourth controlling valve 224 are all electromagnetic pinch valves.

The disposable fully sealed piping system having the microporous membrane filter 31, the primary filter 32, the rotary joint 33, the disposable syringe 34, the equilibrium liquid container 35, the cell suspension container 36, the enzyme solution container 38, and the pipe assembly 37, together with the instrument system having the rotary arm 21, the electromagnetic controlling valve 22, the injection pump 23, the temperature control unit for equilibrium liquid 24, the temperature control unit for cell suspension 25, and the vibrator for cell suspension 26, constitutes the above cell separation system, which could complete the process of washing tissue cells, digestion in the enzyme solution, filtering and separating cells, and washing and collecting cells. The cell separation system with simple sealed structure and being adaptable to harvest the required cells, is operated under a non-polluting environment, and helps in production of cell extraction.

Figure 9:
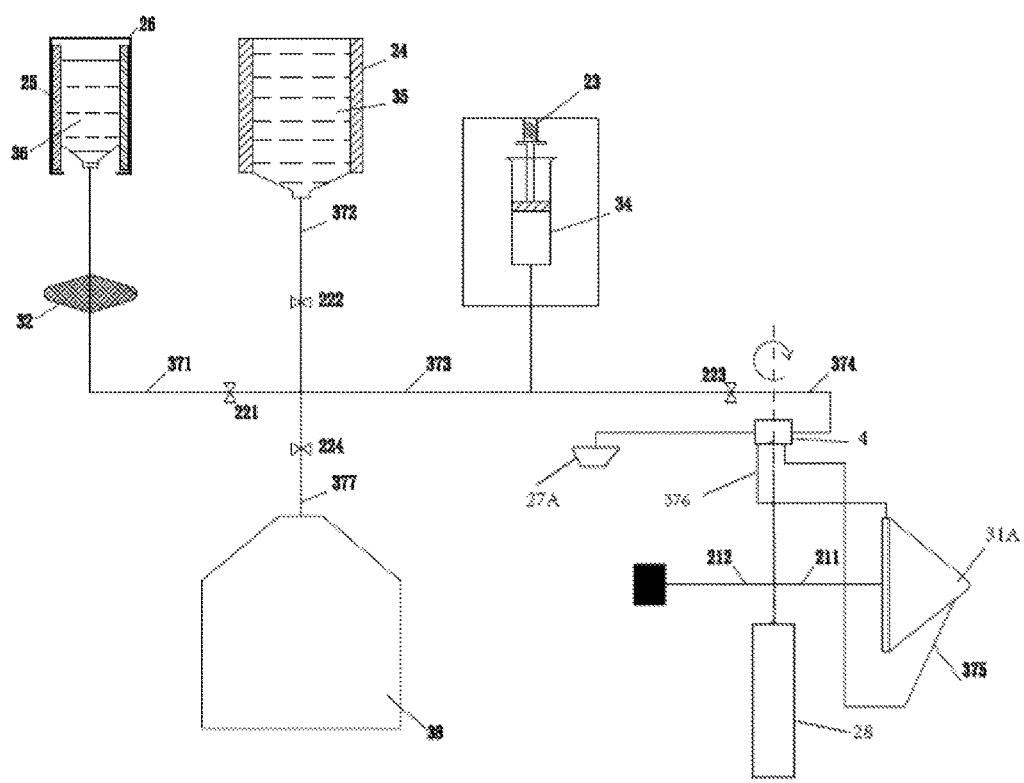
FIG. 9 is a schematic drawing showing a cell separation system having the centrifugal filtration device with the microporous membrane filter shown in FIG. 6 and the liquid distributor shown in FIG. 8.

In another embodiment of the cell separation system, referring to FIG. 9, the cell separation system also includes two parts, which are a disposable fully sealed piping system and an instrument system.

The disposable fully sealed piping system in this embodiment includes a microporous membrane filter 31A, a primary filter 32, a liquid distributor 4, a disposable syringe 34, an equilibrium liquid container 35, a cell suspension container 36, an enzyme solution container 38, and a pipe assembly 37.

The pipe assembly 37 comprises a first pipe 371, a second pipe 372, a third pipe 373, a fourth pipe 374, a fifth pipe 375, a sixth pipe 376, and a seventh pipe 377.

The cell suspension container 36 is inverted, whose opening is communicated to the first pipe 371, and the primary filter 32 is mounted on the first pipe 371.

The equilibrium liquid container 35 is inverted, whose opening communicates with the second pipe 372, and second pipe 372 communicates with the first pipe 371.

One end of the third pipe 373 communicates with the junction between the first pipe 371 and the second pipe 372, and the opposite end communicates with the disposable syringe 34.

One end of the fourth pipe 374 communicates with the disposable syringe 34, and the opposite end communicates with a liquid entrance of the liquid distributor 4.

One end of the fifth pipe 375 communicates with a liquid fill port of the liquid distributor 4, and the other opposite communicates with the inlet of the microporous membrane filter 31A.

One end of the sixth pipe 376 communicates with the outlet of the microporous membrane filter 31A, and the opposite end communicates with a drain port of the liquid distributor 4. A liquid exit of the liquid distributor 4 communicates with a waste collection tank 27A.

One end of the seventh pipe 377 communicates with the junction between the first pipe 371 and the second pipe 372, and the opposite end communicates with the enzyme solution container.

The instrument system in this embodiment includes a rotary arm, an electromagnetic controlling valve 22, an injection pump 23, a temperature control unit for equilibrium liquid 24, a temperature control unit for cell suspension 25, and a vibrator for cell suspension 26.

An end of a rotary arm 211 of the rotary arm assembly 21 is mounted on the microporous membrane filter 31A, the liquid distributor 4 is arranged above the spindle 28. A balance member 212 with a balance block of the rotary arm assembly 21 is arranged in the opposite end of the rotary arm. The rotary arm assembly 21 is driven by the spindle 28.

The disposable syringe 34 is controlled by the injection pump 23.

The temperature control unit for equilibrium liquid 24 is arranged outside the equilibrium liquid container 35, to heat the equilibrium liquid and control its temperature.

The temperature control unit for cell suspension 25 is arranged outside the cell suspension container 36, to heat the cell suspension and control its temperature. Furthermore, the cell suspension container 36 and the temperature control unit for cell suspension 25 are arranged on the vibrator for cell suspension 26, which oscillates the cell suspension container 36 automatically with the frequency predetermined by the computer.

The electromagnetic controlling valve 22 includes a first controlling valve 221, a second controlling valve 222, a third controlling valve 223, and a fourth controlling valve 224.

The first controlling valve 221 is mounted on the first pipe 371, and arranged in front of the junction between the first pipe 371 and the second pipe 372.

The second controlling valve 222 is mounted on the second pipe 372.

The third controlling valve 223 is mounted on the fourth pipe 374, and arranged between the liquid distributor 4 and the disposable syringe 34.

The fourth controlling valve 224 is mounted on the seventh pipe 377.

The first controlling valve 221, the second controlling valve 222, the third controlling valve 223, and the fourth controlling valve 224 are all electromagnetic pinch valves.

The disposable fully sealed piping system having the microporous membrane filter 31A, the primary filter 32, the liquid distributor 4, the disposable syringe 34, the equilibrium liquid container 35, the cell suspension container 36, the enzyme solution container 38, and the pipe assembly 37, together with the instrument system having the rotary arm 21, the electromagnetic controlling valve 22, the injection pump 23, the temperature control unit for equilibrium liquid 24, the temperature control unit for cell suspension 25, and the vibrator for cell suspension 26, constitutes the above cell separation system, which could complete the process of washing tissue cells, digestion in the enzyme solution, filtering and separating cells, and washing and collecting cells. The cell separation system with simple sealed structure and being adaptable to harvest the required cells, is operated under a non-polluting environment, and helps in production of cell extraction.

In this embodiment, the whole system is fully sealed, the cells cannot be damaged and polluted, and it is also easy for collecting the waste.

Cell Separation Method

A cell separation method employing the cell separation system mentioned below is described. A better understanding to the structure and the function of above cell separation system could be obtained, through the description of this cell separation method.

The cell separation method is carried out by extracting adipose stem cells from the adipose tissue from the human body as raw material.

The method includes the following steps (valves which are not mentioned in the steps are closed by default):

1. Heating the equilibrium liquid, and connecting the containers for one time use, the filter, syringe and the pipe assembly together.

The certain temperature set in the temperature control unit for equilibrium liquid 24 is 37° C., the equilibrium liquid container 35 is arranged in the temperature control unit for equilibrium liquid 24, to heat the equilibrium liquid until its temperature reaches 37° C., and the equilibrium liquid with 37° C. is not only used to prepare collagenase solution, but also provide cell washing liquid. The instrument system is connected to the piping system: the first pipe 371 is connected to the cell suspension container 36, the second pipe 372 is connected to the equilibrium liquid container 35, the seventh pipe 377 is connected to the enzyme solution container 38, the disposable syringe 34 is connected to the injection pump 23, the rotary joint 33/the liquid distributor 4 is mounted on the holder, the microporous membrane filter 31 is mounted on the rotary arm 211.

2. Digesting adipose tissue in the enzyme solution.

The adipose tissue is put into the cell suspension container 36, which is not a PVC (polyvinyl chloride) infusion set. The equilibrium liquid whose volume equals to that of the adipose tissue is extracted from the equilibrium liquid container 35, and is poured into the enzyme solution container 38. In this embodiment, the equilibrium liquid which is Lactated Ringer's solution, is mixed with the collagenase which is taken according to the enzymatic activity described in the collagenase product description, to form the enzyme solution for digesting adipose tissue, and the enzyme solution in enzyme solution container 38 is poured into the cell suspension container 36. The certain temperature set in the temperature control unit for cell suspension 25 is 37° C. And then the vibrator for cell suspension 26 which the cell suspension container arranged on starts to oscillate, the speed is 100 RPM (Revolution Per minute), the time is 20-40 minutes, the digestion time is adjusted based on the enzymatic activity and the adipose tissue digestion degree. The adipose tissue is digested by the enzyme solution to be divided into three layers from bottom to top—water solution layer, emulsion layer, and oil layer. The adipose stem cells are arranged in the water solution layer and the emulsion layer. Since the bottom of the cell suspension container 36 is connected to the first pipe 371, the injection pump is set to filter and separate cells from the cell liquid. Furthermore, in other embodiment of the present invention, if the raw material is other tissue, the layering of the solution might not be three layers as shown in above embodiment, but the cell liquid amount is under controlled, the person skilled in the art just need to do some adjustments to obtain the targeted cells.

3. Filtering out the impurities and molecules using the filter device, separating and extracting cells using the microporous membrane filter.

In step one, the parameters of the filtering process, the centrifuge process and the separation process are set in the computer. The first controlling valve 221 is opened, and the water-soluble cell suspension in the bottom layer in the cell suspension container 36 is drawn out using the disposable syringe 34 which is driven by the injection pump 23. At this point, the cell suspension flows through the primary filter 32, which could filter out the undigested tissue and impurities, etc.

In step two, the first controlling valve 221 is closed, and the third controlling valve 223 is opened, the cell suspension is pushed by the disposable syringe 34 which is driven by the injection pump 23, to run through the fourth pipe 374, the rotary joint 33/the liquid distributor 4 and the fifth pipe 375 to pour into the front cavity of the rotating microporous membrane filter 31, and water, smaller biomolecules and collagenase run into the rear cavity through the filter pores, and then run into the waste collection tank 27 through the sixth pipe 376. The cells remain in the front cavity, and flung from the filter membrane owing to the centrifugal force, which avoids membrane fouling. The rotating radius of the rotary arm is 20 cm and the rotation speed of the rotary arm is 1500 revolutions per minute.

In step three, the above processes are repeated, until the cell suspension which is under the oil layer in the cell suspension container is drawn out completely.

In order to increase efficiency on cell separation, the equilibrium liquid could be poured into the pipe assembly repeatedly and the cell filtering process could be also conducted repeatedly, the steps in detail are as follow: the second controlling valve 222 is opened, the equilibrium liquid with temperature 37° C. in the equilibrium liquid container 35 is drawn out, in this embodiment, the equilibrium liquid 100 ml. And then the second controlling valve 222 is closed, and the first controlling valve 221 is opened, and the equilibrium liquid is injected into the cell suspension container 36, and the step two is repeated, so as to obtain cells in the emulsion layer.

4. Washing cells in the microporous membrane filter using the equilibrium liquid. Firstly, the second controlling valve 222 is opened, and the equilibrium liquid in the equilibrium liquid container 35 is drawn out using the disposable syringe 34. Then, the second controlling valve 222 is closed, the third controlling valve 223 is opened, to make the equilibrium liquid run into the front cavity of the microporous membrane filter 31 through the fourth pipe 374, so as to wash the cell liquid in the front cavity, and remove the harmful small molecules. The washing liquid in this embodiment is 150 ml.

This washing step is carried out to separate cells from enzyme in the cell liquid.

5. Removing the microporous membrane filter 31, and sealing it.

The microporous membrane filter 31 is removed, and the cell liquid in it could be used directly. In this embodiment, the inlet tube and the outlet tube are cut by a thermal scissors and sealed, so that the microporous membrane filter stores cells for use. The microporous membrane filter 31 is oscillated by a vibrator just before used.

The cell separation method achieves a series of processes, such as digesting tissue, filtering cells, gaining cells and collecting cells automatically, which are carried out in the disposable fully sealed piping system, avoiding pollution due to exposition to external factors, reducing cell mechanical trauma in the operation, and harvesting cells with high survival rate.

In other embodiments of the present invention, the piping system could be different from the above embodiment, as long as the corresponding functions are achieved.

All the above are the preferred embodiments of the present invention. It is to be understood that, for one skilled in the art, the invention is intended to cover various modifications and equivalent arrangements included within the principle of the invention.

What is claimed is:

1. A centrifugal filtration device, for separating living cells, comprising a spindle, a rotary arm which is connected perpendicularly to the spindle and rotating as the spindle rotates, a microporous membrane filter which is mounted on the rotary arm, and a liquid distributor arranged on the rotary arm in the place right above the spindle to form a coaxial line passing through the spindle and the liquid distributor;

wherein the liquid distributor comprises a liquid entrance, a liquid entering chamber, a liquid entering pipe which connects the liquid entrance and the liquid entering chamber, a liquid exit, a liquid exiting chamber, and a drain pipe which connects the liquid exit and the liquid exiting chamber, the liquid entering chamber has at least one liquid fill port, the liquid exiting chamber has at least one drain port;

the microporous membrane filter comprises an inlet, an outlet, a front cavity having the inlet formed thereon, a rear cavity having the outlet formed thereon, and a filter membrane arranged between the front cavity and the rear cavity and arranged in a direction vertical to the rotary arm; the inlet is in communication with the liquid fill port, the outlet is in communication with the drain port, each filter pore formed in the filter membrane has a diameter smaller than that of each of the living cells which needs to be separated; the inlet and the front cavity are arranged further away from the spindle than the outlet and the rear cavity are arranged; during centrifugation water in a cell suspension, biological particle and biomolecules pass through the filter membrane owing to a flowing fluid pressure, and the living cells are blocked by the filter membrane and flung from the filter membrane to deposit in the front cavity due to the centrifugal force.

2. The centrifugal filtration device according to claim 1, wherein the rotary arm has a length of 10-30 cm, the rotary arm has a rotation speed of 500-1500 revolutions per minute, and the centrifugal force produced by the rotary arm is 50-800 g.

3. The centrifugal filtration device according to claim 1, wherein a cross section of the front cavity is round, the area of the cross section of the front cavity becomes smaller in the direction which is away from the filter membrane.

4. The centrifugal filtration device according to claim 1, wherein the diameter of the filter pore formed in the filter membrane is 1-30 um.

5. The centrifugal filtration device according to claim 1, wherein the filter membrane has a monolayer membrane structure, the filter pore runs through the filter membrane and the filter pore is cylindrical.

6. The centrifugal filtration device according to claim 1, wherein the liquid entering pipe and the drain pipe are coaxial.

7. The centrifugal filtration device according to claim 1, wherein the front cavity includes an upper wall which is adjacent to the filter membrane, the inlet is formed on the upper wall.

8. The centrifugal filtration device according to claim 7, wherein the front cavity includes a side wall which is connected to the upper wall, a passage extending to the bottom of the front cavity is formed inside the side wall, and the passage is in communication with the inlet.

* * * * *